United States Patent

[11] 3,612,871

| [72] | Inventors | Wayne T. Crawford<br>Livermore, Calif.;<br>James S. Humphrey, Jr., Schenectady,<br>N.Y.; Warren De Sorbo, deceased, late of<br>Ballston Lake, N.Y. by Muriel J. De Sorbo,<br>administratrix |
|---|---|---|
| [21] | Appl. No. | 812,463 |
| [22] | Filed | Apr. 1, 1969 |
| [45] | Patented | Oct. 12, 1971 |
| [73] | Assignee | General Electric Company<br>Continuation-in-part of application Ser. No.<br>741,190, June 28, 1968, now abandoned. |

[54] METHOD FOR MAKING VISIBLE RADIATION DAMAGE TRACKS IN TRACK REGISTRATION MATERIALS
17 Claims, 3 Drawing Figs.

[52] U.S. Cl. .................................................. 250/83
[51] Int. Cl. ........................................... G01t 5/00, G01t 5/02
[50] Field of Search ........................................ 250/83 CD, 83 PH

[56] References Cited
UNITED STATES PATENTS

| 3,415,993 | 12/1968 | Fleischer et al. | 250/83 |
| 3,493,751 | 2/1970 | Davies et al. | 250/83 CD |

Primary Examiner—Archie R. Borchelt
Attorneys—Ivor J. James, Jr., Samuel E. Turner, John R. Duncan, Frank L. Neuhauser and Oscar B. Waddell ABSTRACT: An improved method for treating a plastic film by charged particle irradiation to make tracks formed in the film visible. The film is subjected to irradiation with charged particles, then is exposed to radiation selected from the group consisting of electromagnetic radiation having wavelengths less than about 4,000 angstroms and electrons having energy levels above about $1.5 \times 10^6$ electron volts in the presence of oxygen. When treated with a solvent which preferentially attacks the material along the particle tracks, the tracks dissolve away rapidly, leaving substantially cylindrical holes in the film, with little degradation of the body of the film. This preetching treatment results in more rapid etching of the damage tracks, in tracks of more uniform cross section, in smaller initial pore sizes and in greater thermal stability of the tracks.

PATENTED OCT 12 1971　　　　　　　　　　　　　　3,612,871

INVENTORS:
WAYNE T. CRAWFORD
JAMES S. HUMPHREY, JR.
WARREN DESORBO, deceased
BY MURIEL J. DESORBO, Administratrix BY: *John R. Duncan*

ATTORNEY

METHOD FOR MAKING VISIBLE RADIATION DAMAGE TRACKS IN TRACK REGISTRATION MATERIALS

CROSS-REFERENCE TO RELATED APPLICATIONS

This application is a continuation-in-part of copending U.S. Pat. application Ser. No. 741,190, filed June 28, 1968, now abandoned.

BACKGROUND OF THE INVENTION

Recently, there has been developed a technique through which the tracks formed by nuclear charged particles in a solid body may be made visible. This technique is described in detail in U.S. Pat. No. 3,303,085 to Price et al. and in the article "Tracks of Charged Particles in Solids" by R. L. Fleischer, P. B. Price and R. M. Walker, Science, July 23, 1965, Volume 149, Number 3,682.

This particle track registration process uses a body which may be a crystalline solid such as mica or a noncrystalline material such as inorganic glass or an organic polymeric plastic. When the body is irradiated with charged particles, damage tracks are formed in the material by local alteration of the material structure along the particle trajectories. The damage tracks are then made visible by the application to the body of a solvent which preferentially attacks the altered material along the damage tracks. Individual tracks are visible under an optical microscope after this "etching" treatment. Prior to etching, the tracks are generally not detectable. Since individual tracks tend to scatter light, areas containing large numbers of closely spaced tracks are visible to the unaided eye as a white, light-diffusing area.

A wide variety of uses have been discovered for these particle track registration processes and materials. Where the irradiated body is in the form of a thin sheet or film, the holes will pass entirely through the sheet. The perforated sheets thus formed have utility as membrance filters, as described in detail in U.S. Pat. No. 3,303,085, since the individual holes have diameters in the range of 5-20,000 angstroms.

These techniques have also been found useful in neutron radiography, as described in copending U.S. Pat application Ser. No. 558,490, now U.S. Pat. No. 3,493,751 (filed June 17, 1966) and 601,112, now U.S. Pat. No. 3,457,408 (filed Dec. 12. 1966).

These particular track registration techniques have also found utility in a wide variety of other areas, including the detection of radon gas (as described in copending U.S. Pat application Ser. No. 787,431 filed July 19, 1967), in bulk tracing (as described in copending U.S. Pat. application Ser. No. 580,873, now U.S. Pat. No. 3,486,027, filed Sept. 21, 1966), assaying solutions for alpha-particle-emitting materials (as described in copending U.S. Pat. application Ser. No. 708,255, filed Feb. 26, 1968) and others.

While the present particle track registration techniques give excellent results in each of these varied areas, further improvements would be desirable.

In the production of filters, it is highly desirable that the perforations be substantially cylindrical in shape. If the perforations are relatively wide at the sheet surface and narrow near the center of the sheet, particles in the solution being filtered may partially enter the perforation and jam at the narrow zone, clogging the filter, Where the etching solvent attacks the body of the sheet while it attacks the damage track material, the ultimate perforation will have this undesirable noncylindrical shape. Thus, it is of the highest importance that the etchant selectively dissolve the altered material along the damage tracks at a much higher rate than it dissolves the body sheet.

Certain materials which have physical characteristics which would make excellent filters, radiographic detector sheets, etc., are not well suited for particle track registration use, since no solvent is available which attacks the altered material along the tracks at a sufficiently greater rate than they attack the sheet body. While these materials are useful in specific instances, they do not produce filters, radiographic, etc., of as high quality as would be desirable.

Where the track etches at a high rate, it would be possible to produce filters of very small pore size, since the pore will etch through before the etchant has time to widen the pore by etching into the surrounding undamaged material.

Also, some of the useful etchant-sheet material combinations which produce good results are etched at an undesirably slow rate. Where the etchant attacks the altered material very slowly, attempts have been made to increase the etching rate by heating the etchant, etc. However, still more rapid action is desirable in many cases, such as the production of long continuous filter webs, as described, for example, in copending U.S. Pat. application Ser. No. 571,819, filed Aug. 11, 1966.

Under some conditions, formed damage tracks tend to be annealed out when the material is heated slightly. This may be undesirable where the charged-particle-irradiated sheet must be shipped some distance between irradiation and etching, some tracks may be lost if the sheet is subjected to slightly elevated temperatures. Preferably, sheets for such uses would have higher thermal stability.

Thus, there is a continuing need for improvements in the formation and development of charged-particle tracks in solids.

SUMMARY OF THE INVENTION

It is, therefore, an object of this invention to provide a process for producing and making visible the tracks of charged particles in solids which overcomes the above-noted problems.

Another object of this invention is to provide a process forming visible holes along charged-particle tracks in solid bodies which produces substantially cylindrical holes.

Another object of this invention is to provide a process for forming smaller pores along charged-particle tracks in solid bodies.

Still another object of this invention is to improve the thermal stability of charged-particle damage tracks in solid bodies.

Still another object of this invention is to provide a more rapid process for dissolving altered material along charged-particle tracks in solid bodies.

A still further object of this invention is to provide a process for producing and making visible the tracks of charged particles in solids which is capable of utilizing a wide variety of different solid materials.

The above objects, and others, are accomplished in accordance with this invention by including a step of exposing the solid body to radiation selected from the group consisting of electrons having energy levels above about 1 m.e.v. and electromagnetic radiation having wavelengths of less than about 4,000 angstroms in the presence of oxygen after the body has been irradiated with charged particles but before the tracks have been treated with a solvent which selectively attacks the altered materials along the tracks.

Both high-energy electron beams and electromagnetic radiation have been found to be beneficial. Any suitable electromagnetic radiation having wavelengths less than about 4,000 angstroms may be used. Typically, the radiation may be ultraviolet, gamma, electron beam or X-radiation. Ultraviolet radiation is preferred, since it gives the greatest improvement in track-etching rate and other characteristics, consistent with reasonable exposure time.

BRIEF DESCRIPTION OF THE DRAWING

The invention will be further understood upon reference to the drawing, wherein.

DETAILED DESCRIPTION OF THE INVENTION

Figure 1:
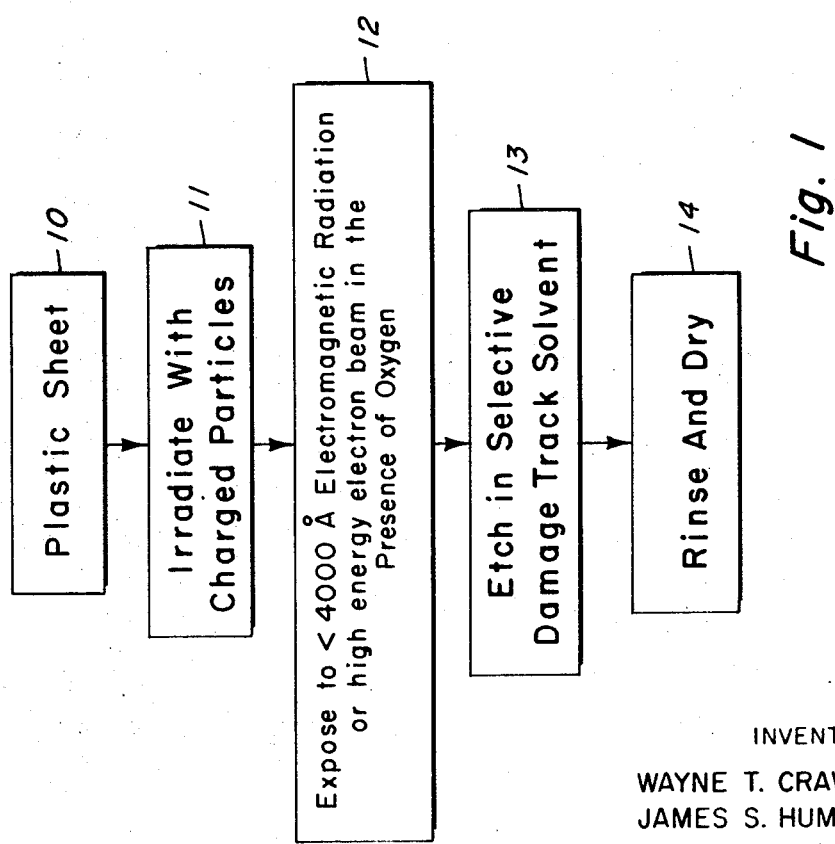
FIG. 1 shows a flowsheet for a preferred track registration process according to this invention.

Referring now to FIG. 1, there is seen a flowsheet pointing out the steps in a preferred process according to this invention.

As indicated in box 10, a sheet of track-registration material is prepared or otherwise obtained. As is further detailed below, a wide variety of materials may be used. Optimum materials for a given set of circumstances may be selected, depending on handling conditions, type of charged particles to be registered, etc.

The sheet of track-registration material is irradiated with charged particles as indicated in box 11 to form damage tracks comprising altered material along the charged-particle paths or trajectories in the material.

Next, the irradiated material is exposed to electromagnetic radiation having wavelengths below about 4,000 angstroms or high-energy electrons in the presence of oxygen as indicated in box 12. As is further discussed below, while the mechanism is not fully understood, this treatment permits much more rapid selective etching of the altered material along the damage tracks than is the case where this treatment is omitted. In addition, etched tracks formed after this treatment tend to be much more uniformly cylindrical in shape. Where this treatment is omitted, good etched tracks may be obtainable only with extensive aging, and the tracks tend to be conical, being wider at the material surface.

Next, the treated material is contacted with an etching solution as indicated in box 13, which selectively attacks and dissolves the altered material along the tracks and enlarges the damage tracks to the desired diameter. As is further described below, a wide variety of etching solutions and conditions may be used, where suitable. While these solutions do attack the body of the track-registration material, they attack the altered material along the damage tracks much more rapidly.

Finally, the material is removed from the etching solution, rinsed (generally with water), and dried, as indicated in box 14.

The sheet is now ready for the intended ultimate use. Individual tracks are visible by optical microscopy, and large numbers of tracks in a small area are visible to the naked eye as a white-appearing light scattering or diffusing area.

Figure 2:
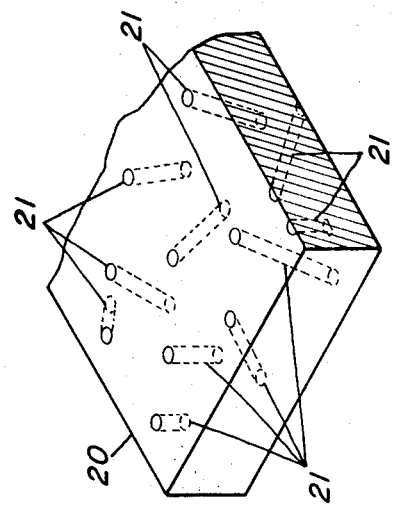
FIG. 2 is an enlarged view schematically showing a portion of a track-registration sheet after irradiation with charged particles.
Figure 3:
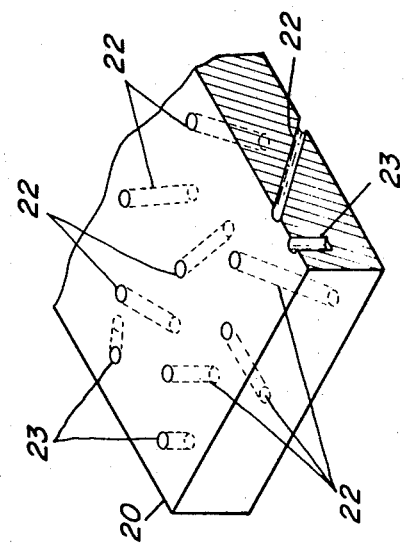
FIG. 3 is an enlarged view of the sheet shown in FIG. 3 after treatment with the selective etching solution.

FIGS. 2 and 3 schematically show the track-registration material after irradiation with charged particles and after etching, respectively.

As seen in FIG. 2, the track-registration material 20 contains a plurality of substantially invisible damage tracks 21 caused by the passage of charged particles. As can be seen, the particles entered the material at a variety of angles. Of course, the particles may be collimated, if desired, so that all enter at substantially the same angle. At this time the tracks are substantially invisible.

FIG. 3 shows material 20 after the treatment with the radiation described above in the presence of oxygen and after etching. Holes entirely through the material, as at 22, are formed where high-energy particles passed entirely through the material. Lower energy particles result in substantially cylindrical pits such as those at 23.

Any suitable synthetic resins may be treated by the process of this invention. Typical synthetic resins include: polyester resins such as polycarbonates, polyethylene terephthalate; cellulosics such as cellulose nitrate, and cellulose acetate; and mixtures thereof. Where the track-forming charged particles are alpha particles, the cellulosics are preferred, while polycarbonates are preferred where the tracks are formed by relatively heavy fission fragments.

Any suitable source of charged particles may be used. Typical sources include self-fissioning isotopes such as californium-252; isotopes which decay by the emission of alpha particles, such as radium-226, and americium-241; materials such as uranium-235 which fission and emit fission fragments when irradiated with neutrons; material such as boron-10 which emit alpha particles when irradiated with neutrons; and various atomic and subatomic particle accelerators.

Any suitable etchant may be used to enlarge the damage tracks to the desired diameter. The etchant may be an aqueous or nonaqueous solution of acidic or basic catalysts or redox agents, where suitable. Typical etchants include sodium hydroxide, potassium hydroxide, lithium hydroxide, chromic acid, potassium permanganate, ammonium hydroxide, potassium t-butoxide, tetrapropyl ammonium hydroxide, and mixtures thereof. While any suitable solution concentrations may be used, a concentrated solution is generally preferred for more rapid track enlargement. Similarly, while the etching solution may be used at any suitable temperature, it is generally preferable to heat (but not boil) the solution to increase the rate of track enlargement. Best results are obtained in general with an about 6-normal solution of sodium hydroxide at about 80° C., with stirring or agitation of the solution during treatment.

The sheet may be treated with the etching solution for any suitable time period. Where the period is too short, the tracks may not have a sufficient diameter for the intended use, while too long a treating period may allow the solution to attack the body of the sheet excessively. The optimum time period will vary, of course, depending upon the sheet material, the etchant, desired pore size and the solution concentration and temperature. Typically, with a polycarbonate sheet, developed in 6-normal sodium hydroxide at about 60° C., about 20 minutes in the solution produces fully developed tracks having a diameter of about 0.5 microns.

As is further pointed out in the examples below, treating the charged-particle-irradiated sheet with electromagnetic radiation having wavelengths of less than about 4,000 angstroms or high-energy electrons in the presence of oxygen has been found to greatly increase the etching rate of the altered material along the charged-particle tracks. It has been found that the etching rate of the bulk of the irradiated sheet does not significantly increase after this treatment. The pores formed by etching the treated sheets have been found to be substantially cylindrical while those formed in untreated sheets often are somewhat conical, being wider at the sheet's surface. Also, it has been found that pores having smaller initial diameters may be produced in the treated sheet. While it is not fully understood why this dramatic improvement results from this intermediate treatment, it is thought that the underlying processes are related to photochemical reactions which involve a radical species in the altered material and oxidation reactions thereof. While it has been found that energy in any region below about 4,000 angstroms is beneficial, in general ultraviolet radiation is preferred since it gives excellent results and may be conveniently and economically used on a laboratory or production basis.

The presence of oxygen may be assured merely by performing the electromagnetic irradiation treatment in air. Slightly improved results are obtained where the atmosphere is enriched in oxygen, or is substantially pure oxygen. However, in general the added costs of the enriched atmosphere is greater than the value of the proved results. Thus, in general an air atmosphere will be preferred.

While an atmosphere containing molecular oxygen, such as air, is generally most convenient, gases containing oxygen in other forms may be used, where suitable. For example, $N_2O$, NO, $SO_3$, $SO_2$ and mixtures thereof may be used, if desired. Depending upon the radiation selected, different forms of oxygen-containing atmospheres may be preferred.

Any suitable source of electromagnetic radiation in the desired region may be used. Ultraviolet radiation may be produced by conventional ultraviolet lamps, while gamma radiation may most conveniently be produced in a small nuclear reactor or gamma-emitting isotopes, such as colbalt-60 and high-energy electrons may be produced in a conventional electron beam generator.

Details of the invention will be further understood upon reference to the following examples, which point out various preferred embodiments of the process of this invention. Parts and percentages are by weight unless otherwise indicated.

EXAMPLE I

A 0.5 sheet of "Kimfol," a polycarbonate sheet available from P. J. Schweitzer, Inc., is placed adjacent a californium-252 source. The californium-252, a self-fissioning isotope, is electroplated onto a platinum substrate as a very thin layer. The fission fragments generated by fission in the californium-252 are collimated by means of a piece of aluminum "honeycomb" having hexagonal cells having a diameter of about one-eighth inch and a length of about nine-sixteenth inch. The collimated fission fragments are directed against the polycarbonate sheet at an angle of about 15°, so that the length of etched tracks formed along the fission-fragment tracks can be more easily measured. The irradiation is performed in a vacuum, to assure maximum track depth. While the irradiation can be performed in air, helium or other gases, the atmosphere will tend to degrade fission fragment energy, resulting in shorter tracks.

The irradiated sheet is divided into a plurality of pieces. A first piece is immediately etched in a 6-normal sodium hydroxide solution at about 60° C. for about 15 minutes. The sheet is rinsed, dried and examined. No tracks are visible under a 1,250 power microscope.

The remaining pieces of the irradiated sheet are exposed to ultraviolet energy from a H3T7 mercury vapor lamp, available from General Electric Company, using three General Electric outdoor rapid start ballasts, Catalog No. 6G3568, in series, operated at 120 volts and 2.1 amps. The pieces are exposed for varying periods at varying lamp-to-sheet spacings. Then, each piece is etched in the sodium hydroxide solution as described above. The sheets are then examined with an 800 power microscope. The ultraviolet lamp spacing, exposure time and track length in microns observed for each sample are listed in the table following.

TABLE 1

| Exposure time (minutes) | Lamp-to-sample spacing (feet) | | |
| --- | --- | --- | --- |
| | 1 | 2 | 3 |
| 0.5 | 5.5 | ~1 | None |
| 1.0 | 9 | ~2 | None |
| 5.0 | 15 | 10.5 | 4 |
| 10.0 | 16 | 16 | 10 |

A fully developed track has a length of about 16 microns, since this is the fission fragment penetration distance. The fully developed tracks are found to have a diameter of about 0.2 micron and to be substantially cylindrical in shape.

EXAMPLE II

A sheet of "Lexan" polycarbonate material, available from the General Electric Company, is placed adjacent a layer of uranium-235 powder bonded to a glass plate. An object is placed against this sandwich and neutrons from a "window" in a nuclear reactor are directed through the object. After irradiation of about 3 minutes, at a neutron flux of about $10^6$ neutrons per square centimeter per second, the sandwich is removed and separated. Neutrons which reach the U-235 layer cause fission of the U-235, resulting in fission fragments which penetrate the polycarbonate sheet, leaving substantially invisible tracks of altered material along the trajectories.

The polycarbonate sheet is divided into four portions. The first portion is immediately etched in a 4-normal potassium hydroxide bath, at a temperature of about 60° C., for about 10 minutes. After water rinsing and drying, the sheet appears unchanged to the naked eye, and no tracks are detectable with a 1,250 power microscope. This first portion is replaced in the bath and etched for an additional 30 minutes. After again rinsing and drying, the sheet is examined with the 1,250 power microscope. The presence of tracks still cannot be detected.

The second portion of the sheet is exposed to ultraviolet light from the H3T7 mercury vapor lamp described in example I at a distance of about 2 feet for about 10 minutes in a vacuum. The sheet is then placed in the above-described etching bath for about 10 minutes. After a water rinse and drying, the sheet is examined. No tracks are visible, even using the 1,250 power microscope. After reetching for an additional 30 minutes, the presence of tracks is still not detectable under the microscope.

The third portion of the sheet is allowed to age in air for about 2 weeks. The sheet is then etched in the above-described etching bath for about 30 minutes. After water rinsing and drying the sheet is examined. A pattern of tracks is clearly visible to the naked eye, although individual tracks are not. A clear image of the object is seen against a white-appearing background. This variable-density neutron radiographic image results from the light diffusing or scattering effect of very large numbers of closely spaced tracks. In areas receiving fewer fission fragments (due to absorption of neutrons in the object) the image density is lower. Individual tracks, of good quality but with a slight conical shape, are visible through an 800 power microscope.

The forth portion is treated with ultraviolet light from the H3T7 mercury vapor lamp, at a distance of about 2 feet for about 15 minutes in an oxygen atmosphere immediately after the fission fragment irradiation. After this treatment, the sheet is immediately placed in the above-described etching bath and etched for about 10 minutes. The sheet is then rinsed with water and dried. An excellent variable-density neutron radiographic image of the object can be seen with the naked eye. Individual tracks, of excellent quality and a substantially cylindrical shape are visible with the 800 power microscope.

Thus, it is seen that the ultraviolet treatment in the presence of oxygen results in much more rapid track development and in higher quality and more uniform tracks.

EXAMPLE III

A solution containing about 1 gram/liter plutonium-239 is prepared. Plutonium-239 emits alpha particles as it decays. A sheet of cellulose nitrate having a thickness of about 0.1 inch is immersed in the solution for about 10 minutes. The sheet is then removed, rinsed with water and dried and divided into two portions. The damage tracks resulting from alpha particles penetrating the sheet are not at this time visible under an optical microscope.

The first portion of the sheet is immediately placed in a 6-normal sodium hydroxide solution for about 5 minutes at about 40° C. The sheet is water rinsed, dried and examined. Poor, short tracks are visible.

The second portion is exposed to ultraviolet light by means of an H100 black light lamp, available from General Electric Company, in an air atmosphere. Total exposure is about 15 minutes at about 1 cm. from the sheet. This portion of the sheet is then immersed in the above-described etching solution for about 5 minutes. The sheet is water rinsed, dried and examined under an 800 power microscope. Tracks of better quality and length are seen. The tracks can be easily counted; this portion is found to have about 340 tracks in a 0.05-mm.$^2$ field.

EXAMPLE IV

A sandwich made up of a 5-mil aluminum foil, a 2micron layer of natural uranium and a 1-mil sheet of "Mylar" polyethylene terephthalate material, available from E. I. du Pont de Nemours and Company, is exposed to thermal neutrons in a reactor. A neutron flux of about $10^7$ neutrons per square centimeter per second is continued for about 1 minute. Fission fragments produced in the uranium layer penetrate the polyester sheet, leaving substantially invisible damage tracks. The sandwich is removed from the reactor and the sheet is examined. No tracks are visible under a 1,250 power microscope. The sheet is then divided into two portions.

The first portion is immersed in a 6-normal sodium hydroxide solution at about 60° C. for about 20 minutes. The portion is then rinsed with water, dried and examined. No tracks are visible under the 1,250 power microscope. This first portion is then exposed to ultraviolet light by means of an F6T5BLB black light lamp, available from General Electric Company, at a distance of 1 cm. for 25 minutes in an air atmosphere. The portion is then reimmersed in the above-described etching solution for an additional 10 minutes. The portion is again water rinsed, dried and examined. Good quality tracks are now clearly visible under the microscope.

The second portion is treated with ultraviolet light as described above, immediately after the removal from the reactor. After etching in the above-described bath for about 10 minutes, this second portion of the sheet is rinsed, dried and examined. Tracks of excellent quality and uniformity, having a substantially cylindrical shape, are easily seen with the 800 power optical microscope.

EXAMPLE V

A sheet of Kimfol polycarbonate material is exposed to fission fragments from a californium-252 source as described in example I. The sheet is then divided into three portions. The first portion is exposed to about $2 \times 10^6$ roentgens of gamma radiation from a test reactor in an air atmosphere. The second portion is exposed to about $2 \times 10^6$ roentgens of gamma radiation in a nitrogen atmosphere. The third portion is not treated. Each of the three portions is then etched by placing them in a 6-normal sodium hydroxide solution at about 60° C. for about 8 minutes. Each portion is then removed from the etching solution, rinsed with water and dried. The portions are then examined with an 800 power microscope. The first portion, which was exposed to the gamma radiation in the presence of oxygen, exhibits excellent tracks which are fully developed to a depth of about 14 microns. No tracks are observable with the microscope on either the second portion, which was exposed to gamma radiation but not in the presence of oxygen, or the third portion which was not exposed to gamma radiation.

EXAMPLE VI

A sheet of Kimfol polycarbonate film having a thickness of about 10.3 microns is exposed to fission fragments from a californium-252 source spaced about three-eighth inch from the film. The exposure is sufficient to expose the film to about $10^4$ fission fragments per square centimeter. The sheet is divided into two portions. The first portion is exposed to an X-ray beam (unfiltered Cu-K, 1.54 angstroms) for about 5 minutes with an X-ray defraction apparatus XRD-4, available from the General Electric Company. During the exposure a stream of oxygen is directed against the film surface facing the beam. The second portion of the film is exposed to the X-ray beam in a similar manner, except that the nitrogen atmosphere is maintained around the film. Each of the two portions is then developed by placing the film in a 3.1-normal sodium hydroxide solution for about 60 minutes. The two portions are then examined. Pores passing entirely through the film are observed in the first portion, while no continuous pores are observed in the second portion. The second portion is replaced in the bath and etched for an additional 140 minutes. Upon examination, again no pores passing through the film are observed.

EXAMPLE VII

The experiment of example VI is repeated, except that in place of the exposure to X-radiation, the first and second portions are exposed to a high-energy electron beam (1.5 m.e.v., $25 \times 10^6$ roentgens) for abut about 5 minutes, in an oxygen and a nitrogen atmosphere, respectively. After development for about 60 minutes, pores passing entirely through the film are observed in the portion which was treated with the electron beam in the oxygen atmosphere, while no pores passing through the film are observed in the portion which was exposed to the electron beam in the nitrogen atmosphere.

EXAMPLE VIII

A plurality of portions of Kimfol polycarbonate film having a thickness of about 10.3 microns are exposed to fission fragments from calimornium-252 until the irradiation reaches about $10^4$ fission fragments per square centimeter. Different films are exposed to ultraviolet radiation for varying time periods in different gas atmospheres are indicated in the tables below. The ultraviolet exposure is accomplished by two ultraviolet lamps positioned 3 inches from either side of the sample. The lamps are Model H100FL4 ultraviolet lamps, available from the General Electric Company. The lamps are filtered so that major spectral distribution occurs between 3,600 and 3,800 angstroms. Power output for this region is noted at approximately 3.8 watts. These samples are kept at a constant temperature of about 30° C. during the exposure period. After exposure, each sample is treated with a 3.1-normal sodium hydroxide solution to which is added about 0.5 volume percent Dowfax 2A1 surfactant, available from the Dow Chemical Company. Conductivity of the films is continuously monitored during development so that the time of first pore breakthrough can be determined. Table 2 below gives the results for a variety of ultraviolet exposure times and gas environments. In this table, $t_B$ is the time of first core breakthrough, $V_G$ is the general bulk etching rate of the film material in the solution, $V_T$ is the etching rate of the damaged track and the cone angle is the angle of the pore wall to a line perpendicular to the surface of the film, calculated from $V_G$ and $V_T$ for first core breakthrough.

TABLE 2

| Sample No. | Area (cm.$^2$) | Time exposed to UV-gas (30° C.) (min.) | $t_B$ (min.) | $V_G$ (A./min.) | $V_T$ (A./min.) | Cone angle $\theta$ (deg.) |
|---|---|---|---|---|---|---|
| 1 | 0.24 | 0.0 | 220.0 | ~0.6 | $2.34 \times 10^2$ | 0.15 |
| 2 | .28 | 3'20" (O$_2$) | 15.6 | .65$_7$ | $3.32 \times 10^3$ | .011 |
| 3 | .28 | 3'20" (O$_2$) | 14.2 | .65$_4$ | $3.62 \times 10^3$ | .010 |
| 4 | .30 | 3'20" (CO$_2$) | 210.3 | ~.6 | $2.45 \times 10^2$ | .14 |
| 5 | .30 | 3'20" (air) | 36.6 | .75 | $1.41 \times 10^3$ | .031 |
| 6 | .28 | 3'20" (N$_2$) | >320 | ~.6 | $<1.5 \times 10^2$ | >.22 |
| 7 | .24 | 30.0 (CO$_2$) | 90.0 | ~.6 | $5.72 \times 10^2$ | .060 |
| 8 | .24 | 30.0 (air) | 7.6 | .66$_9$ | $6.78 \times 10^3$ | .0057 |
| 9 | .23 | 30.0 (O$_2$) | 4.3 | .57 | $1.20 \times 10^4$ | .0027 |

It can be seen from table 2, above, significant increases in track etching rate are observed only where there is the combination of ultraviolet exposure and an oxygen-containing environment This treatment both dramatically increases the track etching rate while decreasing the cone angle. The treatment does not have an adverse effect on the bulk etching rate.

The second group of samples are prepared, exposed and developed as described above and the results are shown in table 3 below. In these experiments, an oxygen atmosphere is used while the length of the ultraviolet exposure is varied.

TABLE 3

| Sample No. | Area (cm.²) | Total Tracks | Time Exposed (min.) | $t_B$ (min.) | $V_T$ (A./min.) | Cone Angle $\theta$(deg.) |
|---|---|---|---|---|---|---|
| 1 | 0.039 | 19 | 0.0 | 196.0 | $2.63 \times 10^2$ | $0.13_5$ |
| 2 | 0.042 | 10 | 5.0 | 17.8 | $2.89 \times 10^3$ | $0.012_1$ |
| 3 | 0.040 | 13 | 5.0 | 15.4 | $3.34 \times 10^3$ | $0.010_6$ |
| 4 | 0.034 | 10 | 10.0 | 13.1 | $3.93 \times 10^3$ | 0.0009 |
| 5 | 0.036 | 11 | 10.0 | 33.5 | $<1.54 \times 10^3$ | $0.023_1$ |
| 6 | 0.041 | 20 | 20.0 | 6.2 | $8.030 \times 10^3$ | 0.0043 |
| 7 | 0.027 | 10 | 30.0 | 1.6 | $3.22 \times 10^4$ | 0.0011 |
| 8 | 0.051 | 28 | 180.0 | <1.0 | $>5.25 \times 10^4$ | <0.0007 |

As can be seen from table 3 above, increasing ultraviolet exposure continuously increases the track etching rate.

EXAMPLE IX

A sheet of Kimfol polycarbonate resin is exposed to fission fragments from a californium-252 source, as described in example I. The sheet is divided into two portions. The first portion is maintained in the dark in an atmosphere of nitric oxide. The second portion is exposed to ultraviolet radiation as described in example I, except that the atmosphere surrounding the sample is nitric oxide. Each sample is then etched as described in example I. The portion of the sheet exposed to ultraviolet radiation in the presence of nitric oxide is found to have longer, more fully developed and more cylindrical pores than does the sheet which was not exposed to the ultraviolet radiation.

Although specific materials, components, proportions and conditions have been described in the above examples, others may be used as listed above with similar results, where suitable. In addition, other materials may be added to the track registration sheets, etching bath, etc., to enhance or otherwise modify their properties.

Other modifications and ramifications of the present invention will occur to those skilled in the art upon reading the present disclosure. These are intended to be included within the scope of this invention.

We claim:

1. In a track registration process wherein a track registration material is irradiated with charged particles which form tracks of altered material along their trajectories in the material and the irradiated material is etched with a reagent which selectively attacks and enlarges the altered material along said tracks whereby said tracks are made visible; the improvement wherein said irradiated material is exposed to radiation selected from the group consisting of electromagnetic radiation having wavelengths less than about 4,000 angstroms and electrons having energy levels above about $1.5 \times 10^6$ electron volts.

2. The process according to claim 1 wherein said charged particles are alpha particles and said track registration material comprises cellulose materials.

3. The process according to claim 1 wherein said charged particles are fission fragments and said track registration material comprises a polycarbonate resin.

4. The process according to claim 1 wherein said electromagnetic radiation is ultraviolet radiation.

5. The process according to claim 4 wherein said ultraviolet radiation has wavelengths in the region from about 3,600 to about 3,800 angstroms.

6. The process according to claim 1 wherein said electromagnetic radiation is gamma radiation.

7. The process according to claim 1 wherein said electromagnetic radiation is X-radiation.

8. The process according to claim 1 wherein said electromagnetic radiation results from electron beam irradiation.

9. A track registration process comprising the steps of irradiating a track registration material with charged particles which form damage tracks along paths in said material traversed by said charged particles; exposing the irradiated material to radiation selected from the group consisting of electromagnetic radiation having wavelengths less than about 4,000 angstroms and electrons having energy levels above about $1.5 \times 10^6$ electron volts.

10. The process according to claim 9 wherein said charged particles are alpha particles and said track registration material comprises cellulose materials.

11. The process according to claim 9 wherein said charged particles are fission fragments and said track registration material comprises a polycarbonate resin.

12. The process according to claim 11 wherein said material is immersed in an etching solution comprising about 6-normal sodium hydroxide at a temperature of from about 50° C. to about 80° C. for about 5 to 20 minutes.

13. The process according to claim 9 wherein said electromagnetic radiation is ultraviolet radiation.

14. The process according to claim 13 wherein said ultraviolet radiation has wavelengths in the region from about 3,600 to about 3,800 angstroms.

15. The process according to claim 9 wherein said electromagnetic radiation is gamma radiation.

16. The process according to claim 9 wherein said electromagnetic radiation is X-radiation.

17. The process according to claim 9 wherein said electromagnetic radiation results from electron beam irradiation.